United States Patent Office 3,243,437
Patented Mar. 29, 1966

3,243,437
PYRIMIDINE PHOSPHOROTHIOATES
Edward Sherlock, Bracknell, England, assignor to Imperial Chemical Industries Limited, London, England, a corporation of Great Britain
No Drawing. Original application Apr. 11, 1960, Ser. No. 21,133. Divided and this application Feb. 10, 1965, Ser. No. 431,725
Claims priority, application Great Britain, Apr. 23, 1959, 13,940/59
4 Claims. (Cl. 260—251)

This is a division of my earlier application Serial No. 21,133, filed April 11, 1960, now U.S. Patent No. 3,185,699.

This invention relates to new heterocyclic compounds and their salts, and to pesticidal compositions containing them. The invention is a modification of the invention described in prior U.S. application Serial No. 764,498, filed October 1, 1958, now abandoned.

Serial No. 764,498, filed October 1, 1958 described and claims s-triazine derivatives of the formula:

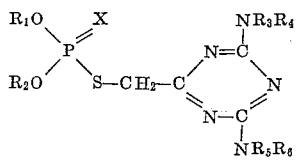

in which $R_1$ and $R_2$ are methyl or ethyl radicals; $R_3$, $R_4$, $R_5$, and $R_6$, which can be the same or different, are each a hydrogen atom or a methyl, ethyl, propyl or butyl radical, or $R_3$ and $R_4$, or $R_5$ and $R_6$, together with their adjacent nitrogen atom constitute a piperidino ring; and X is an atom of oxygen or sulphur, and acid addition salts thereof. These compounds possess aphicidal properties.

It has now been found that many heterocyclic compounds and their salts having structures similar to those of the compounds described above have pesticidal properties; in particular against aphids and phytophagous mites, for example red spider mites.

Accordingly, the present invention provides new heterocyclic compounds of the formula:

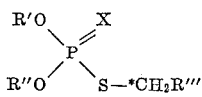

in which R' and R" are alkyl radicals having up to four carbon atoms; X is an atom of oxygen or sulphur; and R''' is a substituted or unsubstituted pyrimidine ring attached to the carbon atom designated by an asterisk through a carbon atom of said ring, and salts of said compounds.

It has been found that, in general, compounds of the invention in which group X is oxygen have higher activity than the analogous compounds in which X is sulphur.

The heterocyclic ring of the compounds of the invention can contain one or more substituents, for example, alkyl, cycloalkyl, aryl or aralkyl radicals, or amino, hydroxy, or carboxylic ester groups; and the substituents can be carried by either carbon or nitrogen atoms in the ring. Examples of suitable alkyl radicals include alkyl radicals having 1-4 carbon atoms, for instance, methyl, ethyl, and propyl radicals. Examples of suitable cycloalkyl, aryl and aralkyl radicals are respectively, cyclohexyl, phenyl and benzyl radicals.

As stated above, the salts of the new heterocyclic compounds defined above are included in the invention. This is true, of course, in respect of any individual compound only in so far as that compound is capable of salt formation; for example, tetrazoles are, in general, not basic compounds and do not form salts. The preferred salts are acid addition salts, which can be salts derived from an organic acid, for example oxalates, or from an inorganic acid, for example hydrochlorides.

The invention also includes a process for the preparation of the compounds of this invention in which a compound of the formula:

$$Y—CH_2R'''$$

is reacted with a compound of the formula:

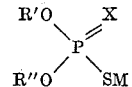

where Y is an atom of chlorine, bromine or iodine, R", R''' and X have any of the meanings given to them above, and M is an atom of an alkali metal, for instance sodium or potassium, or an ammonium radical.

The process can be conveniently performed using a solution or dispersion of the reactants in a suitable organic solvent. Suitable solvents are a lower alkanol (for example methanol or ethanol), acetone and dioxane. The temperature required for the reaction naturally depends to a large extent upon the reactivity of the reactants; with some reactants it can take place at room temperature, but generally the reactants need to be heated, for example, to a temperature in the range 40° C. to 100° C., to obtain an adequate rate of reaction. In general, it is convenient to boil under reflux a solution of the reactants in a suitable organic solvent.

The invention also includes pesticidal compositions containing, as active ingredient, a compound of the invention or a salt thereof, in admixture with a suitable diluent or carrier. The pesticidal compositions can, for example, be a liquid composition in which the active ingredient is dissolved or dispersed in a suitable liquid medium or it can be a powder composition.

The compounds of the invention have only low solubility in water, but are, in general, sufficiently soluble to enable aqueous solutions of low pesticidal concentrations to be prepared. However, in order to facilitate the preparation of aqueous solutions, especially where higher pesticidal concentrations are required, it has been found advantageous to dissolve the compound initially in a small quantity of methanol, tetrahydrofurfuryl alcohol, diacetone alcohol or β-ethoxy ethanol, and to dilute the resulting organic solution with sufficient water to obtain the desired aqueous solution.

Where the pesticidal composition of the invention is a powder composition, the active ingredient can be in admixture with an inert pulverulent solid, for example fuller's earth, talc, kaolin, kieselguhr or bentonite. If desired, the pesticidal compositions, whether liquid or solid, can contain a suitable wetting or dispersing agent, or other suitable auxiliary agent known in the art as being useful in pesticidal compositions.

The invention also includes a method of combating aphids and phytophagous mites, in which the aphids, mites or plants susceptible to attack by said aphids or mites are treated with a compound or a pesticidal composition of this invention.

The invention is illustrated by the following examples.

*Example 1*

This example describes the preparation of 4-diethoxyphosphinylthiomethyl imidazole. This compound does not contain a pyrimidine ring in accordance with the invention but the example illustrates the method employed in making the compounds of the invention.

4-chloromethylimidazole hydrochloride (9 g.) was slurried with absolute ethanol (100 cc.) and anhydrous sodium carbonate (3 g.) added to the slurry. The slurry was allowed to stand for 30 minutes, being shaken occasionally, filtered, and the solid thus removed washed with a little ethanol and the washings added to the filtrate which was a solution of 4-chloromethylimidazole.

Sodium O:O' diethyl phosphorothiolate (11.3 g.) was added to the filtrate with shaking, the mixture thus obtained allowed to stand at room temperature for 2 hours and then filtered to remove the sodium chloride which had precipitated. The solvent was removed from the filtrate by evaporation under reduced pressure leaving 4-diethoxyphosphinylthiomethyl imidazole as a light brown oily residue. This residue was purified by dissolving it in ether, washing three times with a small volume of water, drying over anhydrous sodium sulphate and removing the solvent by distillation under reduced pressure.

The compounds of this invention have been prepared by methods analogous to that described in Example 1 above, and are set out below as Examples 2–4.

Table I below (which contains Examples 2–4) shows the solvent and time of reaction used in preparing the various compounds. The products of Examples 2–4 were prepared by heating the reactants at the reflux temperature of the solvent. Table I also defines the halogen atom of the heterocyclic methyl halide and the alkali metal of the salt of the O:O'-dialkyl-phosphorothiolic or phosphorodithioic acid used as reactants in the preparation of the various compounds. The column on the right-hand side of the table gives the melting point (or, where the heterocyclic is a liquid, the boiling point) of the various heterocyclic compounds; and where the compounds are solids, the solvent from which they have been crystallized.

Compounds described in the examples have been tested and found to be active against the aphids *Macrosiphum pisi* and the phytophagous mites *Tetranychus telarius.*

Each of the compounds was tested in the form of a number of aqueous solutions covering a range of concentrations, and each containing 0.5% by weight of a wetting agent. Similar aqueous solutions of various concentrations of the commercial pesticide parathion were used as a standard for comparison.

The method of testing against *M. pisi* was as follows:

Adult, apterous, viviparous females were sprayed under a Potter Tower apparatus with 2 cc. of each of the aqueous solutions of the test chemical and of parathion, three replicates of 30–40 aphids each being used at each concentration. After being sprayed, the aphids were transferred to 2-oz. jars containing clean broad bean leaves, which were then stored under conditions of constant temperature and humidity for 24 hours, at the end of which time the number of dead aphids were counted and the LD 50 value calculated.

With *I. telarius* the method of testing was as follows:

Small French bean plants in 3" pots were infested with adult female mites, and 24 hours later were sprayed on a turntable with one of the aqueous solutions. In each instance the spray was applied until excess of the solution ran off the plant. The plants were then stored in a heated greenhouse for 3 days, and at the end of that period the number of dead mites was counted and the LD 50 value calculated.

The results obtained from the tests described above are set out in Table II which gives the parathion equivalent of the compounds tested.

TABLE II

| Compound of Example No. | Parathion equivalent | |
|---|---|---|
| | M. pisi | T. telarius |
| 3 | 6.0 | 0.7 |
| 4 | 5.3 | 0.4 |

I claim:

1. A compound selected from the group consisting of compounds having the formula

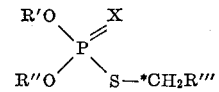

in which R' and R'' are alkyl having up to four carbon atoms, X is an atom selected from the group consisting of oxygen and sulfur, and R''' is selected from the group consisting of an unsubstituted pyrimidine ring attached to the carbon atom designated by an asterisk through a carbon atom of said ring and a pyrimidine ring attached to said carbon atom designated by an asterisk through a carbon atom of said ring and substituted by a member of the group consisting of alkyl having 1–4 carbon atoms, cyclohexyl, phenyl, benzyl, amino and hydroxyl and pesticidal acid addition salts of said compound.

2. The compound having the formula

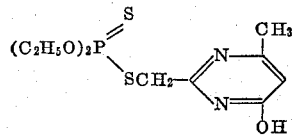

TABLE I

| Example No. | Compound | Reaction Time (hours) | Solvent | Halide | Alkali metal | Properties of Compound | Solvent of Crystallization |
|---|---|---|---|---|---|---|---|
| 2 | (CH₃O)₂P(S)SCH₂–[imidazole with CH₃, OH] | 5 | Methanol | Chloride | Sodium | Undistillable oil | |
| 3 | (C₂H₅O)₂P(O)SCH₂–[imidazole with CH₃, OH] | 1½ | Ethanol | do | do | Melting point 90° C | Ethanol. |
| 4 | (C₂H₅O)₂P(S)SCH₂–[imidazole with CH₃, OH] | 1 | do | do | do | Melting point 122–3° C | Do. |

3. The compound having the formula
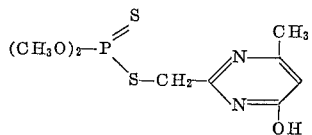
4. The compound having the formula
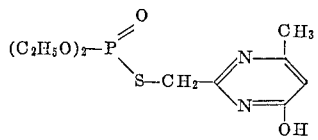
References Cited by the Examiner
UNITED STATES PATENTS
| | | | |
|---|---|---|---|
| 2,754,244 | 7/1956 | Gysin et al. | 260—310 XR |
| 2,922,739 | 1/1960 | Snyder | 260—268 XR |
| 3,131,186 | 4/1964 | Magee et al. | 260—249.5 |
WALTER A. MODANCE, *Primary Examiner.*
JOHN D. RANDOLPH, *Examiner.*
J. M. FORD, *Assistant Examiner.*